US011252631B2

(12) United States Patent
Jendli et al.

(10) Patent No.: US 11,252,631 B2
(45) Date of Patent: Feb. 15, 2022

(54) INTELLIGENT INDICATORS OF DYNAMIC CONNECTIVITY ALTERNATIVES

(71) Applicant: Microsoft Technology Licensing, LLC, Redmond, WA (US)

(72) Inventors: Wael Jendli, Kirkland, WA (US); Jeffrey J. Malvern, Kirkland, WA (US); Anand Muthurajan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 16/803,794

(22) Filed: Feb. 27, 2020

(65) Prior Publication Data

US 2021/0274416 A1    Sep. 2, 2021

(51) Int. Cl.
*H04W 36/36* (2009.01)
*H04W 36/00* (2009.01)
*H04W 36/14* (2009.01)
*H04W 88/06* (2009.01)
*H04W 48/18* (2009.01)

(52) U.S. Cl.
CPC ... *H04W 36/365* (2013.01); *H04W 36/00837* (2018.08); *H04W 36/14* (2013.01); *H04W 48/18* (2013.01); *H04W 88/06* (2013.01)

(58) Field of Classification Search
CPC ............... H04W 36/365; H04W 36/14; H04W 36/00837; H04W 36/0085; H04W 88/06; H04W 48/18; H04W 36/30
See application file for complete search history.

(56) References Cited

U.S. PATENT DOCUMENTS

| 8,849,276 | B2 | 9/2014 | Guilford et al. |
| 9,497,611 | B2 | 11/2016 | McNamee et al. |
| 9,603,059 | B2 | 3/2017 | Vuornos et al. |
| 9,830,191 | B2 | 11/2017 | Nirantar |
| 10,051,523 | B2 | 8/2018 | Kim et al. |
| 2010/0280892 | A1 | 11/2010 | Uzunalioglu et al. |
| 2013/0242964 | A1 | 9/2013 | Hassan |

(Continued)

FOREIGN PATENT DOCUMENTS

| EP | 2900016 A1 | 7/2015 |
| WO | 2008127706 A1 | 10/2008 |
| WO | 2019083753 A1 | 5/2019 |

OTHER PUBLICATIONS

Fakhfakh et al, "Incentive Reward for Efficient WiFi Offloading using Q-Learning Approach", 2017 IEEE (Year: 2017).*

(Continued)

*Primary Examiner* — Omer S Mian

(57) ABSTRACT

Systems and methods herein recognize that form factors executing personal computer (PC) operating systems experience limited connectivity when traveling between WiFi connections and/or wired connections. Not only does this limit research capabilities of the PC form factor while between WiFi and/or wired connections, but the limitations place data integrity at risk. Systems and methods herein monitor for conditions that cause data integrity risks and seamlessly implement solutions that resolve, reduce, and/or manage identified data integrity risk conditions at least by simplifying a user's ability to identify and connect to networks, which offer data integrity risk solutions.

20 Claims, 6 Drawing Sheets

(56) References Cited

U.S. PATENT DOCUMENTS

| | | | |
|---|---|---|---|
| 2014/0179265 A1 | 6/2014 | Bruns et al. | |
| 2015/0365381 A1* | 12/2015 | Durbin | H04L 63/0272 726/15 |
| 2015/0373574 A1* | 12/2015 | Gordon | H04L 41/5067 370/252 |
| 2018/0338278 A1 | 11/2018 | Ketonen et al. | |
| 2019/0281370 A1* | 9/2019 | Struhsaker | A61B 5/00 |
| 2019/0373541 A1* | 12/2019 | Choi | H04W 48/18 |

OTHER PUBLICATIONS

Ma, et al., "Optimal Dynamic Pricing of Mobile Data Plans in Wireless Communications", In Journal of Omega, Feb. 2, 2016, 52 Pages.

"International Search Report and Written Opinion Issued in PCT Application No. PCT/US21/014041", dated May 7, 2021, 15 Pages.

* cited by examiner

INTELLIGENT INDICATORS OF DYNAMIC CONNECTIVITY ALTERNATIVES

BACKGROUND

Mobile devices are growing in popularity. However, WiFi network availability is not meeting the coverage demands of consumers. As users travel between WiFi networks and/or wired networks, users' connectivity is traditionally limited to smart phone form factors executing mobile operating systems having limited capabilities. Further, when using robust application capabilities that are designed for form factors that execute PC operating systems, users lose internet backup capabilities while between internet connection spots leaving them at risk for data loss and document version confusion.

SUMMARY

According to one aspect disclosed herein, there is provided a system for controlling network connectivity of a mobile PC that executes a PC operating system comprising at least one memory and at least one memory and at least one processor, coupled to the memory. In examples, the at least one processor monitors connectivity of an existing WiFi connection of the mobile PC and based at least on the monitoring, detects one or more conditions of the existing WiFi connection that triggers a connectivity analysis. Further, based on the triggering, the at least one processor performs the connectivity analysis, which at least determines dynamic connectivity characteristics of the existing WiFi connection and determines dynamic connectivity characteristics of one or more target cellular connections. Further still, based at least on the connectivity analysis, the at least one processor generates an interactive notification including at least one determined characteristic of the existing WiFi connection and at least one determined characteristic of the one or more target cellular connections. In examples, the system also includes an interactive graphical user interface that at least displays the generated interactive notification and obtains selection input indicating which connection is preferred.

According to another aspect disclosed herein, there is provided a method for controlling network connectivity of a mobile Personal Computer (PC) that executes a PC operating system comprising monitoring, by at least one processor, connectivity of an existing WiFi connection of the mobile PC and based at least on the monitoring, detecting one or more conditions of the existing WiFi connection that triggers a connectivity analysis. Further, based on the triggering, the method performs the connectivity analysis at least by determining dynamic connectivity characteristics of the existing WiFi connection and determining dynamic connectivity characteristics of one or more target cellular connections. Based at least on the connectivity analysis, the method also generates an interactive notification including at least one determined characteristic of the existing WiFi connection and at least one determined characteristic of the one or more target cellular connections. In examples, the method also displays the generated interactive notification on an interactive graphical user interface and obtains selection input indicating which connection is preferred.

According to another aspect disclosed herein, there is provided exemplary computer storage devices having computer-executable instructions stored thereon for controlling network connectivity of a mobile Personal Computer (PC) that executes a PC operating system, which, on execution by a computer, cause the computer to perform operations including monitoring connectivity of an existing WiFi connection of the mobile PC. In examples, based at least on the monitoring, computer-executable instructions cause the computer to one or more conditions of the existing WiFi connection that triggers a connectivity analysis. Based at least on the triggering, exemplary computer-executable instructions cause the computer to perform the connectivity analysis at least by determining dynamic connectivity characteristics of the existing WiFi connection and determining dynamic connectivity characteristics of one or more target cellular connections. Based at least on the connectivity analysis, exemplary computer-executable instructions cause the computer to generate an interactive notification including at least one determined characteristic of the existing WiFi connection and at least one determined characteristic of the one or more target cellular connections. Further, example computer-executable instructions cause the computer to display the generated interactive notification on an interactive graphical user interface and obtain selection input indicating which connection is preferred.

In embodiments the methods may comprise operations in accordance with any of the embodiments disclosed herein.

According to another aspect disclosed herein there is provided software (e.g. an operating system) embodied on a computer-readable medium and configured so as when run on one or more processors to perform operations in accordance with any of the methods disclosed herein.

According to another aspect disclosed herein, there is provided a computer system comprising one or more processors and memory comprising one or more memory units arranged to store code arranged to run on the one or more processors, the code being configured so as when run to perform operations in accordance with any of the methods disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments disclosed herein and to illustrate how such embodiments may be put into effect, reference is made, by way of example only, to the accompanying drawings in which.

Corresponding reference characters indicate corresponding parts throughout the drawings.

DETAILED DESCRIPTION

Figure 1:
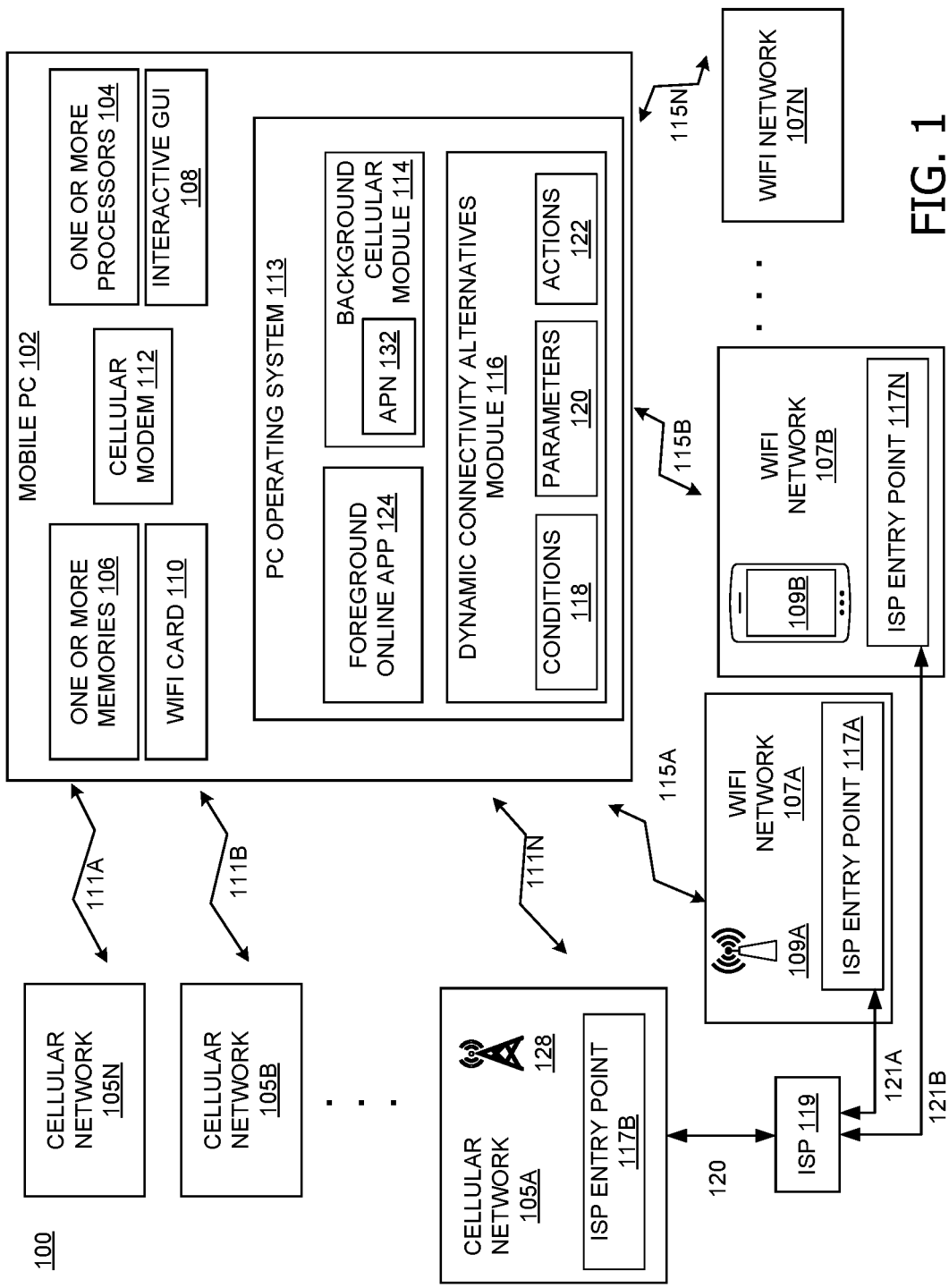
FIG. 1 illustrates an example computer system 100 for controlling network connectivity of a mobile PC.

Personal computer (PC) form factors running a PC operating system (OS) have become increasingly more portable, and wireless connectivity hardware (e.g., WiFi cards) has become common for PC form factors. However, in comparison to personal mobile device form factors running a mobile OS that is designed for highly mobile hardware, such as a smart phone for example, traditional PC form factors are not as mobile because PCs lack functionality within PC operating systems and on PC hardware that allows for the high mobility experienced by mobile devices running mobile operating systems.

PCs running PC operating systems (OSs) experience limited connectivity when traveling between WiFi connections and/or wired connections. Not only does this limit resource capabilities of the PC while between WiFi and/or wired connections, but the limitations may impact data integrity, quality of service, and other system and user experiences. For example, traditional PCs provide connectivity at locations where WiFi is available via WiFi cards and connectivity functionality associated with the WiFi card. When a traditional PC is near a WiFi hot spot, a user may opt to join the WiFi network and communicate with the internet using a WiFi connection. However, when the user leaves the range of the WiFi network, connectivity is lost unless and/or until the PC enters into the range of another WiFi network. As a result, PCs offer significantly less connectivity as compared to mobile devices running a mobile OS.

However, as compared to mobile devices running a mobile OS, because PCs running a PC OS provide significantly more functionality, such as a significantly larger amount of application protocol interfaces (APIs), and support processors that consume comparatively more power and/or create comparatively more heat performing speculative processing in an effort to avoid stalls and increase code processing speed, users and/or industries would benefit from improving conventional PCs running PC OSs such that PCs can have increased connectivity as compared to traditional PCs.

Aspects of the disclosure provide systems and methods that monitor PC connectivity for conditions that may impact data integrity, system processes, or user experiences, and automatically provide available solutions to resolve, reduce, and/or manage identified conditions. The aspects described herein improve the functioning of PC form factors running a PC OS by adding background connectivity analysis functionality that interacts with the hardware of the PC in a unique way in order to automatically determines whether the PC may benefit from connecting to an available cellular network instead of other available networks (e.g., local ethernet connections, available unsecure WiFi connections, available low bandwidth WiFi connections, and/or the like) or in lieu of other available networks. The background connectivity analysis improves PCs by increasing the connectivity and mobility of the PCs, which has more robust functionality and resource capabilities than a traditional mobile device running a mobile OS. Further, including the connectivity analysis functionality as background functionality improves the user experience, prevents the user interface from becoming cluttered, speeds up processing, and minimizes battery consumption.

In some examples, a PC running a PC OS monitors connectivity of an existing WiFi connection and when a condition is detected (e.g., low bandwidth, unsecure communications, lost connectivity, etc.), the PC triggers a background connectivity analysis that determines the accessibility of one or more target cellular networks and determines characteristics of accessible ones of the target cellular connections. In these examples, the background connectivity analysis also determines characteristics of the existing WiFi connection (or recently lost WiFi connection) and generates a notification that is displayed on the user interface. The notification may include one or more of the determined characteristics of the accessible ones of the target cellular connections and one or more of the determined characteristics of the existing WiFi connection, such that a preferable connection from the available connections provided via the notification may be selected.

In some examples, if a cellular connection is selected as being a preferred connection the PC may establish a limited or temporary background cellular connection in the background. This background cellular connection provides the PC with access to the internet, which allows a foreground application to launch on the PC. The foreground application, for example a web page, may display on the PC interface one or more selectable cellular connections from which a cellular connection selection can be made. Upon selection of a cellular connection, the PC may disconnect the background cellular connection and establish the selected cellular connection, maintaining the user experience, data integrity, and/or system processes of the PC.

These improvements to traditional PCs running PC OSs increase the environments in which PCs can experience connectivity thereby causing PCs, which have increased functionality as compared to mobile devices running mobile OSes, to have increased mobility. In one non-limiting example, a PC user experiencing WiFi connectivity at their home may step into a taxi and maintain connectivity via automatic cellular connectivity during a car ride to work and maintain connectivity upon entering their destination via the established cellular connectivity or by switching to a WiFi network at the destination. Such is one example of a connectivity improvement over traditional PCs that typically involve manual tethering to a cell phone to receive cellular connectivity.

FIG. 1 illustrates an example computer system 100 for controlling network connectivity of a mobile PC 102. Mobile PC 102 is a mobile personal computer (PC) form factor running a PC operating system (OS), also referred to as a desktop OS, for example, Windows™ OS, macOS™, and/or the like. Exemplar PC form factors include but are not limited to, laptops, desktops, servers, hybrid tablets, surfaces, gaming systems (e.g. Xbox™) and/or the like. PC form factors are considered mobile PC form factors when the PC includes wireless connectivity hardware (e.g., a WiFi card). In contrast, smart phone form factors (not shown) run mobile operating systems, for example Android™ OS, iOS™, and/or the like. PC operating systems are fundamentally different from mobile operating systems in various ways.

A PC operating system supports significantly more functionality as compared to a mobile OS including many extra drivers supporting a wide array of chip sets, graphics cards, add in cards, input devices, and more. In contrast, mobile OSs are optimized for specific hardware, or a significantly narrower range of hardware as compared to PC operating systems, giving the mobile OS a smaller footprint that is capable of operating on slower processors having less memory (e.g., smart phone form factors) as compared to PC form factors, which may have significantly faster processors and memory capabilities (including addon processors and expandable memories).

Further, mobile OSs support a limited amount of application protocol interfaces (APIs). Limiting the APIs contributes to a mobile OSs footprint being smaller than a PC operating system's footprint. Further, limiting the APIs limit the capabilities of apps developed for a specific mobile OS, which allows a mobile OS to maintain significantly more control of the performance and functionality of apps developed for the mobile OS. In contrast, PC operating systems allow for the installation of additional programming languages and register modifications, both of which greatly expands application interfacing capabilities and shifts control of the performance and functionality of apps into the domain of application developers and PC users.

In some instances, mobile OSs target a different processor as compared to PC operating systems. For example, PC operating systems are designed for processors (e.g., x86 and x64 processors) that consume comparatively more power and/or create comparatively more heat performing speculative processing in an effort to avoid stalls and increase code processing speed. In contrast, mobile OSs are designed for processors that consume comparatively less power (due to battery size restrictions) and/or create comparatively less heat (due to heat dissipation restrictions) in an effort to maximize battery life and avoid wasting hardware real-estate on heat sinks. Moreover, with the inclusion of microwave frequency channels in wireless communications, power consumption and overheating may become an increasing issue that mobile OSs will face.

FIG. 1 illustrates an example computer system 100 for controlling network connectivity of a mobile PC 102. Mobile PC 102 is a mobile personal computer (PC) form factor running PC operating system 113, for example, Windows™ OS, macOS™, and/or the like. Exemplary mobile PC 102 includes one or more processors 104 in communication with one or more memories 106 and an interactive graphics user interface (GUI) 108. Interactive GUI 108 may include one or more displays, one or more touch screens, one or more keyboards, one or more mouse/touch pads, one or more speakers, one or more microphones, one or more sensors, one or more cameras, one or more styluses, and/or other input/output devices.

Mobile PC 102 also includes at least one WiFi card 110 (or similar wireless transceiver that communicates according to wireless internet protocol (IP), e.g., IEEE 802.11 standards), which sends and receives wireless communications from one or more WiFi networks 107A-107N. In instances, WiFi network 107A includes one or more wireless access points 109, such as routers, beacons, WiFi extenders, mesh systems, and/or the like that connect directly or indirectly to one of a variety of internet service providers (ISPs) 119 at an ISP entry point 117B. For example, wireless access point 109 may communicatively couple to a local area network (LAN) that includes a hardwired internet modem and/or other wired ISP entry point 117B to an ISP 119.

As described herein, data communications of mobile PC 102 transmit via a WiFi connection 115A-115B when mobile PC 102 communicates via WiFi card 110 to a wireless access point 109A-115B according to wireless internet protocols (IP), e.g., IEEE 802.11 standards. Further, example WiFi networks 107A-107N may include any number of wireless and/or wired nodes disposed between mobile PC 102 and an ISP entry point 117A-117N, including beacons, routers 109A, switches, hubs, relays, extenders, modems, nodes comprising a modem (e.g., smart phone 109B comprising a modem), and/or the like.

In some examples, WiFi network 107B may include a node and/or wireless access point (e.g., smart phone 109B) that uses a cellular connection at one or more communication stage after WiFi connection 115B and before internet connection 121B between ISP entry point 117N and ISP 119. For example, mobile PC 102 may establish a tethered WiFi connection 115B, with smart phone 109B, which is generating a hotspot. In instances, smart phone 109B operates as a wireless access point by generating a wireless hot spot and using cellular data to access the ISP entry point 117N. Irrespective of communication protocols transmitted in communication channels between smart phone 109B and a downstream ISP entry point 117N, when mobile PC 102 communicates via WiFi card 110 to a tethered a smart phone 109B according wireless internet protocol (IP), e.g., IEEE 802.11 standards, mobile PC 102 is transmitting data via WiFi connection 115B as part of WiFi network 107B.

Mobile PC 102 also includes cellular modem 112 or a similar transceiver that communicates with one or more cellular network 105A-105N according to one or more wireless cellular communications techniques. Exemplary cellular communication techniques include, but not limited to, Code Division Multiple Access (CDMA), Time Division Duplex (TDD), Time Division Multiple Access (TDMA), Frequency Division Multiple Access (FDMA), Orthogonal FDMA (OFDMA), Single-Carrier FDMA (SC-FDMA), System for Mobile Communications (GSM), third generation mobile phone specifications (3G), CDMA2000 also called 3rd Generation part 2 (3GPP2), Long Term Evolution (LTE), LTE-A, 4th Generation (4G) 5th Generation (5G), which is sometimes called NextGen (NG) or new radio (NR), Universal Terrestrial Radio Access (UTRA), Evolved Universal Terrestrial Radio Access (E-UTRA), Universal Mobile Telecommunication System (UMTS), communications of beyond, and/or various combinations thereof, and/or the like.

In examples, cellular networks 105A-105N include numerous strategically spaced base stations or node Bs (e.g., evolved node Bs (eNBs 128)), which may include macro-cells (e.g., towers), femotcells (e.g., small cellular access points), picocells (very small cellular access points), and/or the like. In examples, a base station, the base station controller (BSC), and/or one or more nodes connected thereto (e.g., gateways) operate as a cellular network's ISP entry point 117B. The ISP entry point 117B of cellular network 105A provides an entry point to the public internet via the internet service provider 119.

In examples, mobile PC 102 may include one or more a configurable Access Point Name (APN) 132, which directs one or more processors 104 to stored settings of mobile PC 102 utilized by cellular modem 112 to set up a cellular connection 111N with eNB 128 that routes cellular data communications to an ISP entry point 117B, that operates as a gateway between a cellular network provider of mobile PC 102 and the ISP 119.

Often, one or more base stations to which mobile PC 102 may cellularly connect concurrently manages cellular communications of multiple different cellular network providers (e.g., AT&T™, T-Mobile™, Sprint™, Verizon™, SimOptions™, Vodafone™, Orange™, VIVO™, Claro™, Movistar™, Tracfone™, Boost™, and/or etc.). APN 132 of mobile PC 102 may identify cellular network providers of mobile PC 102. One or more processors 104 utilize information from APN 132, as well as control information received from servicing eNB 208 downlink broadcasts when establishing a cellular connection 111N for routing cellular data traffic requests according to protocols of a cellular network provider of mobile PC 102.

Mobile PC 102 may include instances of one or more applications (e.g., modules). The applications, when executed by one or more processors 104, operate to perform functionality on the mobile PC. The applications may communicate with local applications and hardware as well as remote applications and hardware, some or all of which may be counterpart applications. In examples, applications may perform foreground functionality and/or background functionality. In instances, an application may include perform background functionality as well as provide foreground functionality. Foreground functionality is executed by mobile PC 102 within a user's awareness. In examples, foreground functions may display data on a GUI, output audio on speakers, and/or receive user input via a touchscreen and/or mouse (e.g., display media, play music, and/or display a selectable button) on interactive GUI 108.

In contrast, background functionality is executed outside a user's awareness. For example, negotiating communications connections with wireless access points, encoding data packets for the purposes of transmission, decoding received data packets, tracking timers, location tracking, and/or the like. Some of the functionality of an application may switch back and forth between the foreground and background, and some of the functionality of an application may exclusively remain in the background. In instances, some applications perform most or all functionality exclusively in the background.

Dynamic connectivity alternatives module 116 is an example application that performs background and foreground functionality. In instances, dynamic connectivity alternative module 116 is a module of PC operating system 113. Dynamic connectivity alternatives module 116 executes background functionality that monitors various connectivity signals and identifies one or more conditions 118 and/or parameters 120 associated with various connectivity signals (e.g., WiFi connection 115A-115N, cellular connection 111A-111N, and others) of one or more communication networks (e.g., WiFi network 107A-107N, cellular network 105A-105N, and more). Based on one or more identified conditions and/or parameters, dynamic connectivity alternatives module 116 may trigger a background connectivity analysis that determines connectivity characteristics of one or more connectivity signals of one or more communication networks. Based on the connectivity analysis, dynamic connectivity alternatives module 116 performs background functionality that generates an interactive notification including at least some of the characteristics determined by the connectivity analysis as well as an interactive selection mechanism configured to determine user preferences with respect to at least some of the indicated characteristics.

Dynamic connectivity alternatives module 116 also includes foreground functionality that causes interactive GUI 108 to display a generated interactive notification. In instances, the background generation of an interactive notification prompts interactive GUI 108 to display the generated interactive notification such that user input and/or requests are irrelevant to prompting display of the interactive notification. The displayed interactive notification may identify one or more network connections and provide and/or describe one or more characteristics of the identified one or more network connections. The displayed interactive notification may also present an interactive selection mechanism configured to obtain user input, which dynamic connectivity alternatives module 116 may utilize to determine a user's preferences with respect to one or more of the indicated characteristics and/or one or more identified network connections.

Responsive thereto, one or more processors 104 may perform one or more foreground and/or background actions 122 based on one or more user preferences determined from the obtained user input received by the selection mechanism of the interactive notification. In instances, dynamic connectivity alternatives module 116 may execute one or more rules to determine which one or more actions of the actions 122 will be performed, and the rules may consider at least one or more of the following when selecting an action: one or more obtained user preferences, one or more identified conditions, one or more identified parameters, and/or any combination thereof, and/or the like. Further, reconfiguration of the one or more rules and/or actions 122 may be achieved via PC operating systems updates distributed by the PC operating system developer. Further detail regarding example actions 122 of dynamic connectivity alternatives module 116 are explained below.

In examples, dynamic connectivity alternatives module 116 monitors various connectivity signals of user known networks. A user known network is a communications network that a user knows has an established connectivity with mobile PC 102 or previously had an established connectivity with mobile PC 102. For example, a user known network may be a home WiFi network at the user's home, a WiFi and/or wired LAN at the user's place of employment, a hot spot WiFi network to which the user has previously connected (e.g., coffee shop, library, airport, hotel lobby, etc.). In instances, a user knows that a known network has an established connectivity with mobile PC 102 because the user selected the known network for the purposes of establishing connectivity. For example, a user knows the home WiFi network at the user's home at least because the user selected the home network, from one or more nearby home networks, and performed steps to establish connectivity therewith. In another example, a user knows the wired LAN at the user's place of employment at least because the user docks mobile PC 102 on a docking station at work, which provides wired LAN connectivity. Further, a user knows the hot spot WiFi network to which the user has previously connected (e.g., hotel WiFi) at least because the user selected the hotel WiFi network, from one or more networks, and performed steps to establish connectivity therewith. In short, a user has an awareness of a known network, and one or more known networks may be associated with a mobile PC 102.

Dynamic connectivity alternatives module 116 monitors signals of one or more known networks of mobile PC 102 for one or more conditions 118. In examples, one or more conditions may include, but are not limited to, a recent loss of connectivity, an inability to connect, security properties, levels of security, encryption properties, bandwidth measurements, quality of service measurements, foreground apps running on mobile PC 102, background apps running on the mobile PC 102, a detected location of mobile PC 102, data usage measurements, reaching a data usage limit, usage thresholds, one or more time period, user preference settings, predicted user preferences as is exampled below, usage patterns of mobile PC 102, advanced services available in a particular location and/or time, cost of a particular network, throughput priorities associated with mobile PC 102 and/or network, data throttling, network congestion, network load, load balancing activities, detected threats, power usage, mobile PC 102 temperature measurements, weather conditions, attenuation constraints, antenna functionality, a pattern of signal measurement fluctuations as based on a determinable factor (e.g., signal strength fluctuation as based on location within a building) and/or the like.

In instances, one or more conditions may be stored locally (e.g., one or more memories 106) and/or remotely in one or more dynamic profile that builds over time. One or more profile may me user specific, mobile PC 102 specific, and/or network specific. Machine learning may use data collected in one or more user profile as input to build models that predict user preferences, user patterns, and user selections. Further, machine learning may use data collected in one or more user profile as input to build predictive models associate with one or more network's signal conditions. Further still, machine learning may use data collected in one or more user profile as input to build predictive models that predict user preferences, user patterns, and user selections for one or more groups of a plurality of users and/or user devices. One or more predictions of a predictive model may be fed back into dynamic connectivity alternatives module 116 and used during the monitoring to identify one or more conditions 118. Further, reconfiguration of the one or more conditions 118 may be achieved via PC operating systems updates distributed by the PC operating system developer.

Dynamic connectivity alternatives module 116 may also monitors signals of user unknown networks. A user unknown network is a communications network with which a user has not knowingly caused mobile PC 102 to establish connectivity. In examples, a user unknown network may be the WiFi network of a neighbour with which mobile PC 102 has never established connectivity. In instances, a user unknown network may be a cellular network with which mobile PC 102 has not established connectivity based on a user request for connectivity with that specific network. In instances, dynamic connectivity alternatives module 116 monitors detectable signals of some or a designated portion of user unknown networks.

In examples, base stations of example cellular networks 105A-105N may transmit data and control information related thereto on a downlink signal and/or may receive data and control information from any number of user devices on an uplink. Dynamic connectivity alternatives module 116 of mobile PC 102 may monitor downlink signals information transmitted and/or broadcasted by one or more nearby base station (e.g., eNB 208) for one or more parameters 120. Further, the signal monitoring one or more parameters 120 may be performed even though mobile PC 102 has not set up connectivity with eNB 208.

In examples, one or more parameters 120 may include one or more, and/or any combination thereof, of any conditions mentioned above. In instances, one or more parameters 120 may be dynamically configurable to identify approved specific cellular networks and/or cellular network providers as selected by a remote entity, for example, an operator/administrator of PC operation system 113. Further, one or more parameters 120 may be configurable to identify specific non-approved cellular networks and/or cellular network providers as by a remote entity, for example, an operator/administrator of PC operation system 113. In examples, reconfiguration of the one or more parameters 120 may be achieved via PC operating systems updates distributed by the PC operating system developer.

Mobile PC 102 also includes background cellular module 114. In examples, background cellular module 114 is a module of PC operating system 113 that executes functionality in the background. An exemplar background cellular module 114 is configured with an APN 132 that identifies a cellular network provider chosen by PC operating system 113 for background cellular functionality. In examples, background cellular module 114 is configured with a plurality of APNs to identify a plurality of cellular network providers chosen by PC operating system 113, which increases the probability that mobile PC 102 will be located within the vicinity of at least one of the chosen cellular network providers regardless the geographic region within which mobile PC 102 is located (e.g., New York state, Texas, Hong Kong, Tanzania, etc.). In instances, APNs and/or the plurality of cellular network providers identified thereby may be ranked and/or prioritized to handle circumstances where two or more of the identified cellular network providers are available at the same time. Further, background cellular module 114 may be configured to rank and/or prioritize APNs and/or the plurality of cellular network providers identified thereby using one or more parameters 120 described above.

The one or more cellular network providers of background cellular module 114 is chosen by the developer of PC operating system 113. In examples, a user of mobile PC 102 is prevented from modifying the one or more cellular network providers of background cellular module 114. In some examples, internet connections established by background cellular module 114 are provided at no cost to the user, which in some instances may be at least one of the reasons the user is prevented from selecting which one or more cellular network providers of background cellular module 114. In examples, reconfiguration of any of: background cellular module 114, APN 132, a plurality of APNs, and the ranking/prioritizing between a plurality of APNs and/or the plurality of cellular network providers identified thereby may be achieved via PC operating systems updates distributed by the PC operating system developer.

In examples, one or more actions 122 triggered by dynamic connectivity alternatives module 116 causes one or more processors 104 to execute background cellular module 114. For instance, responsive to determining that connectivity of one or all known networks of mobile PC 102 has been lost, dynamic connectivity alternatives module 116 may trigger execution of background cellular module 114.

Background cellular module 114 utilizes the configured APN 132, or the determined priority APN of a plurality of APNs as described above and establishes a cellular connection with an accessible cellular network via the route and cellular network provider identified by APN 132. In examples, cellular connection established by background cellular module 114 is limited. For example, the limited cellular connection is limited to performing select functions, limited to communicating with select websites, limited to maintaining the connection for a select period of time, limited to communicating a select amount of bits, and/or any other limits as may be configured by the developer of PC operating system 113.

Responsive to establishment of cellular connection 111N, background cellular module 114, or another component of mobile PC 102, causes one or more processors 104 to launch foreground online app 124. In examples, foreground online app 124 may be a locally stored application that PC operating system 113 executes in conjunction with a remote counterpart application to display information on interactive GUI 108. An example cellular connection established by background cellular module 114 provides internet access to the remote counterpart application, which allows the locally stored application to effectively execute and present information via interactive GUI 108.

For instance, foreground online app 124 and remote counterpart application may execute in conjunction to provide access to a distribution point for first-party and third-party selectable digital content and services. In examples, the limited cellular connection may be limited to merely provide access to a remote counterpart application of foreground online app 124. Further still, the limited cellular connection may be limited to merely provide access to select portions of the remote counterpart application, such that execution of foreground online app 124 and the select portions remote counterpart application may execute in conjunction to provide access to a selected subset of digital services as compared to all of the digital services of the distribution point.

For example, any of the one or more conditions and/or one or more parameters identified by monitoring performed by dynamic connectivity alternatives module 116 may be utilized to determine which selectable digital services are accessible via foreground online app 124 and remote counterpart application via the limited cellular connection. In instances, some or all of the one or more conditions and/or one or more parameters identified by monitoring performed by dynamic connectivity alternatives module 116 may be uploaded via the limited cellular connection to a one or more remote processor that determines which one or more selectable digital services of the selectable digital services made available by the distribution point will be made available to mobile PC 102. As discussed above, one or more or any combination of the following may be considered when determining which one or more selectable digital services are made available to mobile PC 102: a recent loss of connectivity, an inability to connect, security properties, levels of security, encryption properties, bandwidth measurements, quality of service measurements, foreground apps running on mobile PC 102, background apps running on the mobile PC 102, a detected location of mobile PC 102, data usage measurements, reaching a data usage limit, usage thresholds, one or more time period, user preference settings, predicted user preferences as is exampled below, usage patterns of mobile PC 102, advanced services available in a particular location and/or time, cost of a particular network, throughput priorities associated with mobile PC 102 and/or network, data throttling, network congestion, network load, load balancing activities, detected threats, power usage, mobile PC 102 temperature measurements, weather conditions, attenuation constraints, antenna functionality, a pattern of signal measurement fluctuations as based on a determinable factor (e.g., signal strength fluctuation as based on location within a building), approved cellular network providers, unapproved cellular network providers, and/or the like.

In examples, the selectable digital services may be limited to cellular connection services. Further, the selectable digital services may be further limited to cellular connection services available at that time at the location of mobile PC 102. Further still, the selectable digital services may be limited and/or organized based on cellular connection services offered by PC operating system 113 selected cellular network providers. A cellular network provider may offer a plurality of cellular connection services that vary according to cost, data speeds, data usage limits, and/or the like. In instances, one or more of the remote processors determine which one or more selectable cellular connection services are made available to mobile PC 102, the one or more of the remote processors may evaluate uploaded conditions and parameter information as well as profile information to determine which cellular connection services of which cellular network providers are made available to mobile PC 102 at that time via the limited cellular connection established by background cellular module 114. In contrast, when a traditional unlimited WiFi connection is established by mobile PC 102, the unlimited internet connection would provide access to the same distribution point for first-party and third-party selectable digital content and services without the limitations discussed above being implemented by background cellular module 114, limited cellular connection established thereby, and/or foreground online application 124 as executed concurrently with a remote counterpart application according to the limited cellular connection.

Figure 2:
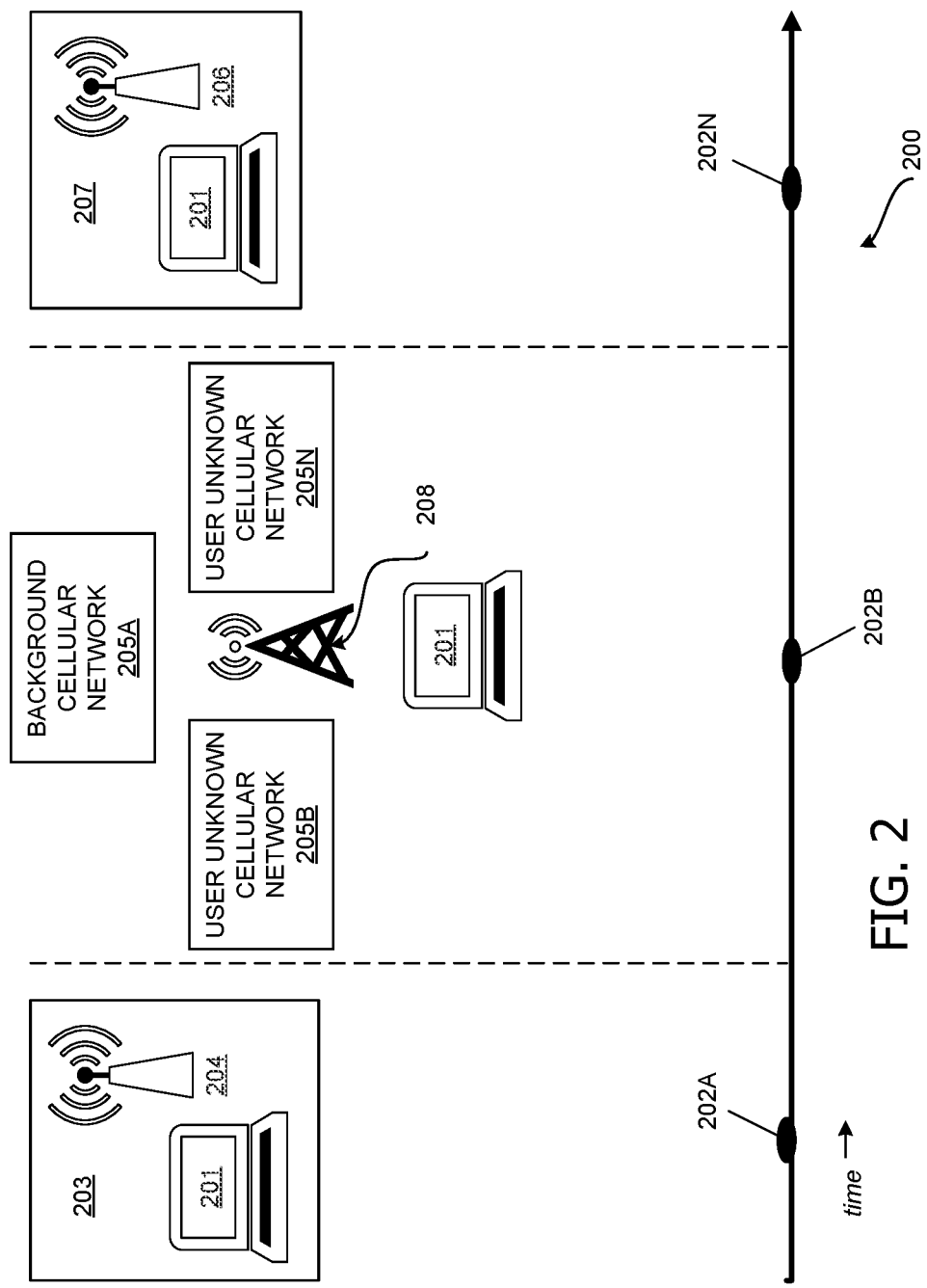
FIG. 2 shows an example timeline 200 of a mobile PC transitioning through physical environments.

FIG. 2 shows an example timeline 200 of a mobile PC transitioning through physical environments. At time 202A, mobile PC 201 is located within a user known WiFi network 203, for example, via wireless router 204 at the user's home, which is operating as a wireless access point to an ISP. While within range of user known WiFi network 203, mobile PC 201 communicates with the public internet via WiFi network 203 and mobile PC 201 monitors one or more conditions of WiFi network 203.

As time transitions from 202A to 202B, mobile PC 201 travels outside the range of user known WiFi network 203, and the mobile PC's monitoring detects the loss of connectivity with user known WiFi network 203. The loss of connectivity is at least one of the conditions for which the mobile PC is configured to monitor, and identification of the condition triggers a connectivity analysis. In examples, the connectivity analysis of mobile PC 201 determines at least one characteristic of WiFi network 203 and/or determines at least characteristic of selectable cellular network 205B and/or selectable cellular network 205N.

Mobile PC 201 uses information determined at least by the connectivity analysis to generate an interactive notification including at least one characteristic of user known WiFi network 203 and at least one characteristic of at least one of selectable cellular network 205B and/or selectable cellular network 205N. In examples, mobile PC 201 may generate an interaction notification identifying user known WiFi network 203 by name and include a characteristic indicating connectivity has been lost and/or is not expected to be regained and further identifying one or more of background cellular network 205A and user unknown cellular networks 205B-205N and including one or more characteristics thereof, for example, the networks connectivity availability, bandwidth speed, security capabilities, cost, geographic coverage, expected duration of connectivity availability, advance services available, and/or the like.

In examples, background cellular network 205A maybe a user unknown cellular network, for instance if mobile PC 102 has not previously established connectivity based on a user request for connectivity with that specific network. Further, background cellular network's 205A status as being the PC operating system's selected background cellular network does not prevent the background cellular network 205A from being transformed into a foreground user known cellular network that provides a user selected level of internet access as opposed to the PC operating system's selected limited access. As such, background cellular network 205A may be one of the at least one cellular network included in the interaction notification generated by mobile PC 201.

When generating interaction notification, mobile PC 201 may also include therein one or more selection mechanism that is responsive to selection input indicating a preference between one or more characteristics of the user known WiFi network 203 and/or one or more characteristics available via at least one of cellular networks 205A-205N.

Responsive to generating the interaction notification, mobile PC 201 causes the interactive notification to present on the foreground of the interactive GUI of mobile PC 201. In examples, a user of mobile PC 201 interacts with at least one of the provided selection mechanisms indicating a preference for at least one characteristic of at least one of cellular networks 205A-205N. Responsive to the obtained selection input indicating a preference for one or more characteristics of one or more cellular networks 205A-205N, mobile PC 201 executes a background cellular module to establish a limited cellular connection with background cellular network 205A (as indicated by an APN of the background cellular module) via eNB 208.

Mobile PC 201 establishes the limited connection with background cellular network 205A because, at time 202B, mobile PC 201 is presently unable to establish connectivity to user unknown cellular networks 205B-205N and unable to establish unfettered connectivity to background cellular network 205A due to mobile PC 201 lacking sufficient connectivity information (e.g., an eSIM profile). Further, at time 202B, mobile PC 201 is located outside the range of a WiFi network to which mobile PC 201 could establish connectivity. In this example, even if mobile PC 201 detected user unknown cellular network 205B and wanted to establish connectivity thereto, mobile PC 201 would be unable to establish connectivity at time 202B because mobile PC 201 has no ability to download sufficient connectivity information (e.g., an eSIM profile) with which to establish connectivity with unknown cellular network 205B. Mobile PC's 201 establishment of the limited connection with background cellular network 205A solves this problem because the limited connection, while limited, provides sufficient access to the internet for mobile PC 201 to request sufficient connectivity information (e.g., an eSIM profile) for unknown cellular network 205B, download the sufficient connectivity information (e.g., an eSIM profile) for unknown cellular network 205B, and use the sufficient connectivity information (e.g., an eSIM profile) to establish connectivity with unknown cellular network 205B. Should mobile PC establish connectivity with unknown cellular network 205B, unknown cellular network 205B would be transformed into user known cellular network 205B having a level of access to the internet as was selected by the user.

As time transitions from 202B to 202C, mobile PC 201 travels into the range of user known WiFi network 207, and the mobile PC's monitoring detects the connectivity availability of WiFi network 207, which may be a public WiFi network, such as a coffee shop, public library, airport, and/or the like, having wireless access point 206.

The new availability of connectivity is at least one of the conditions for which the mobile PC is configured to monitor, and identification of the condition triggers a connectivity analysis. In examples, the connectivity analysis of mobile PC 201 determines at least one characteristic of user known cellular network 205B and/or determines at least characteristic of WiFi network 207.

Mobile PC 201 uses information determined at least by the connectivity analysis to generate an interactive notification including at least one characteristic of user known cellular network 205B and at least one characteristic of WiFi network 207. In examples, mobile PC 201 may generate an interaction notification identifying user known WiFi network 205B by name and include a characteristic indicating network's connectivity availability, bandwidth speed, security capabilities, cost, geographic coverage, expected duration of connectivity availability, advance services available, and/or the like. The interaction notification may further identify WiFi network 207 and one or more characteristics thereof, for example, the network's connectivity availability, bandwidth speed, security capabilities, cost, geographic coverage, expected duration of connectivity availability, advance services available, and/or the like.

When generating interaction notification, mobile PC 201 may also include therein one or more selection mechanism that is responsive to selection input indicating a preference between one or more characteristics of user known cellular network 205B and/or one or more characteristics available via WiFi network 207. Responsive to generating the interaction notification, mobile PC 201 causes the interactive notification to present on the foreground of the interactive GUI of mobile PC 201.

In examples, a user of mobile PC 201 interacts with at least one of the provided selection mechanisms indicating a preference for at least one characteristic of user known cellular network 205B. In instances, the established connectivity with user known cellular network 205B is maintained, and the interaction notification is dismissed.

In some examples, a user of mobile PC 201 interacts with at least one of the provided selection mechanisms indicating a preference for at least one characteristic of WiFi network 207. In instances, the established connectivity with user known cellular network 205B may be terminated, at least for the moment, and the interaction notification may lead the user to connectivity steps for WiFi network 207 and/or be dismissed.

In examples, at time 202B, mobile PC 201 may not have established connectivity with user unknown cellular networks 205B-205N and may not have established unfettered connectivity with user background cellular network 205A. For instance, when mobile PC 201 transitions from time 202B to time 202C, mobile PC 201 may lack connectivity upon detecting the connectivity availability of WiFi network 207. An exemplary dynamic connectivity alternatives module 116 may detect the availability of WiFi network 207 as well as the availability one on or more user unknown cellular networks (not shown). Dynamic connectivity alternatives module 116 may generate an interaction notification identifying WiFi network 207 and characteristics thereof as well as available user unknown cellular networks and characteristics thereof and a selection mechanism that is responsive to selection input indicating a preference therebetween.

Figure 3:
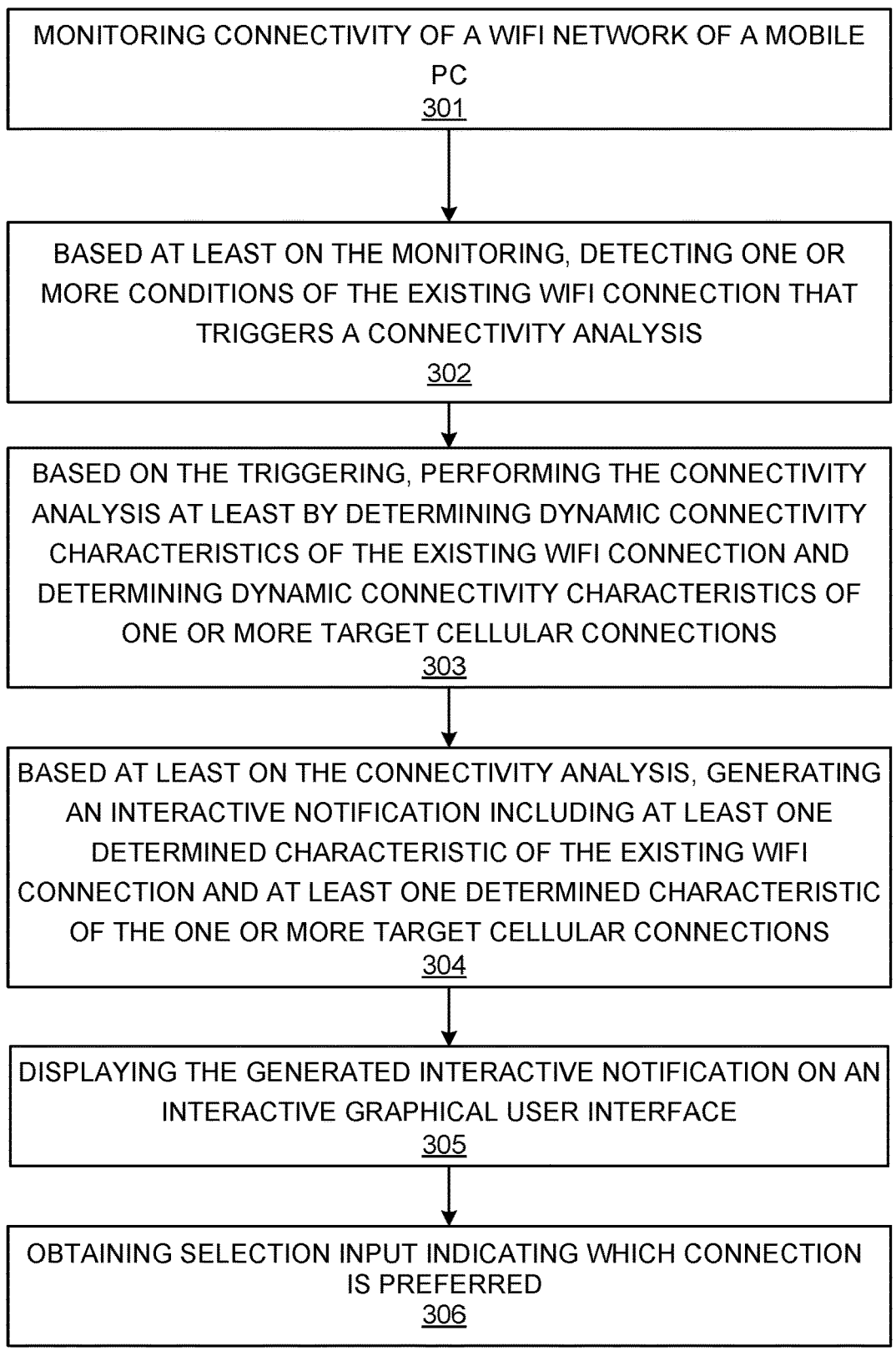
FIG. 3 is an example flow diagram illustrating an example method 300.

FIG. 3 is an example flow diagram illustrating an example method 300. At operation 301, one or more processor of a mobile PC monitors connectivity of a WiFi network of the mobile PC, wherein the WiFi network was previously selected by a user. At operation 302, based at least on the monitoring, one or more processor detects one or more conditions of the WiFi network that triggers a connectivity analysis, wherein the connectivity analysis determines connectivity characteristics of the WiFi network. At operation 303, based at least on the connectivity analysis, one or more processor generates an interactive notification including at least one WiFi network characteristic determined by the connectivity analysis, at least one cellular characteristic of one or more cellular connections, wherein the at least one WiFi network characteristic is different from the at least one cellular characteristic, and a selection mechanism responsive to selection input indicating a preference therebetween. At operation 304 one or more processor displays the generated interactive notification. At operation 305, one or more processor obtains, via the selection mechanism of the interactive notification, the selection input indicating the preference. At operation 306, responsive to the selection input, one or more processor performs an action (as is described in FIG. 5).

Figure 4:
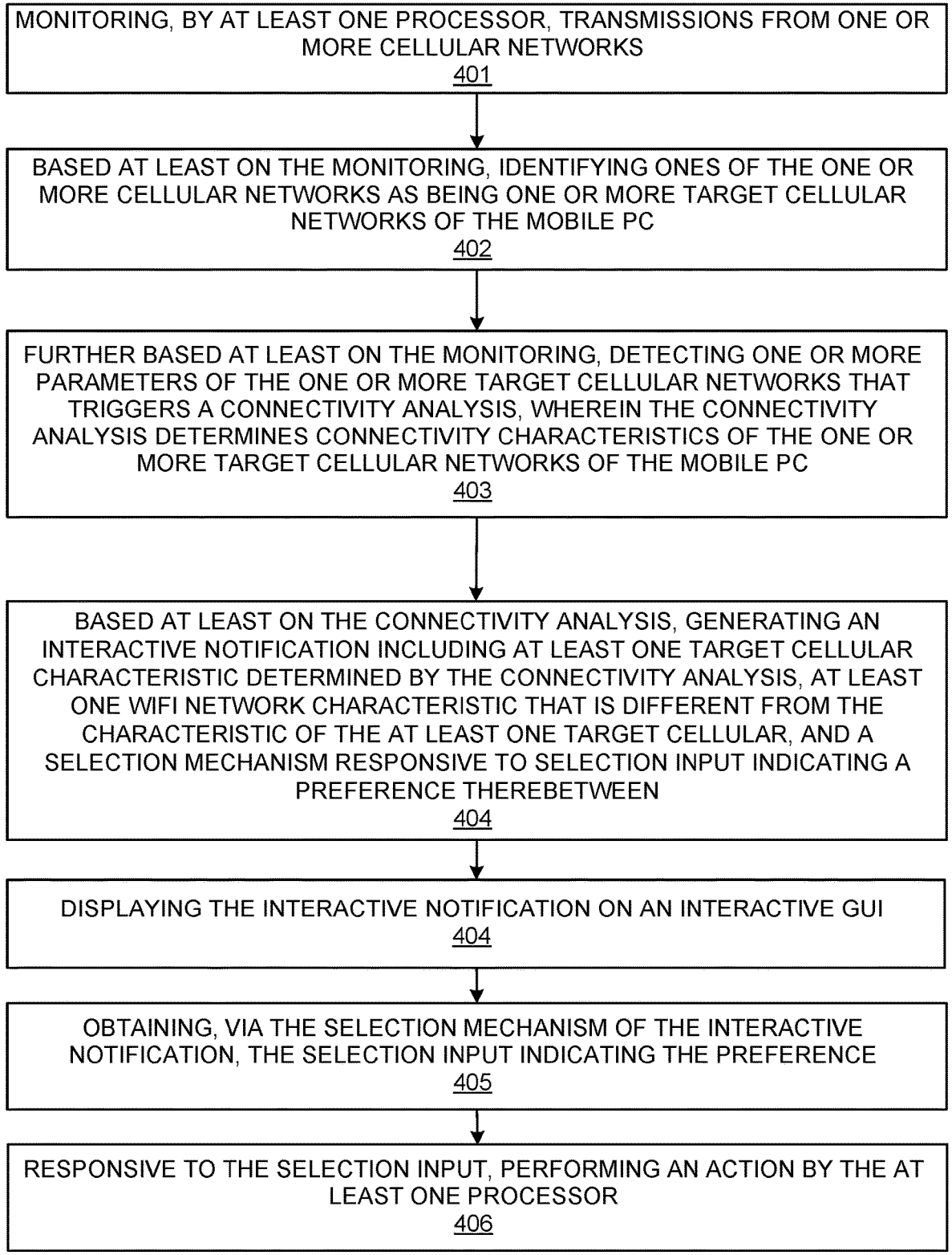
FIG. 4 illustrates an example computer system 400.

FIG. 4 illustrates an example computer system 400. At operation 401, one or more processors of a mobile PC monitors connectivity of a cellular network of the mobile PC. At operation 402, based at least on the monitoring, identifying ones of the cellular networks as being one or more target cellular networks of the mobile PC. In examples, a mobile PC may be configured to identify one or more approved cellular networks, which may be considered target cellular networks. Further, the mobile PC may be configured to identify one or more non-approved cellular networks. In examples, a mobile PC may detect a network that is not categorized within the configuration as being approved or non-approved, the mobile PC may be configured to consider uncategorized networks as being approved, or the mobile PC may be configured to consider uncategorized networks as being non-approved.

At operation 403, further based at least on the monitoring, one or more processors detects one or more parameters of the one or more target cellular networks that triggers a connectivity analysis that determines connectivity characteristics of the one or more target cellular networks of the mobile PC. At operation 404, based at least on the connectivity analysis, one or more processor generates an interactive notification including at least one WiFi network characteristic, at least one cellular characteristic of one or more cellular connections, wherein the at least one WiFi network characteristic is different from the at least one cellular characteristic, and a selection mechanism responsive to selection input indicating a preference therebetween. At operation 405 one or more processors display the generated interactive notification. At operation 406, one or more processors obtain, via the selection mechanism of the interactive notification, the selection input indicating the preference. At operation 407, responsive to the selection input, one or more processor performs an action (as is described in FIG. 5).

Figure 5:
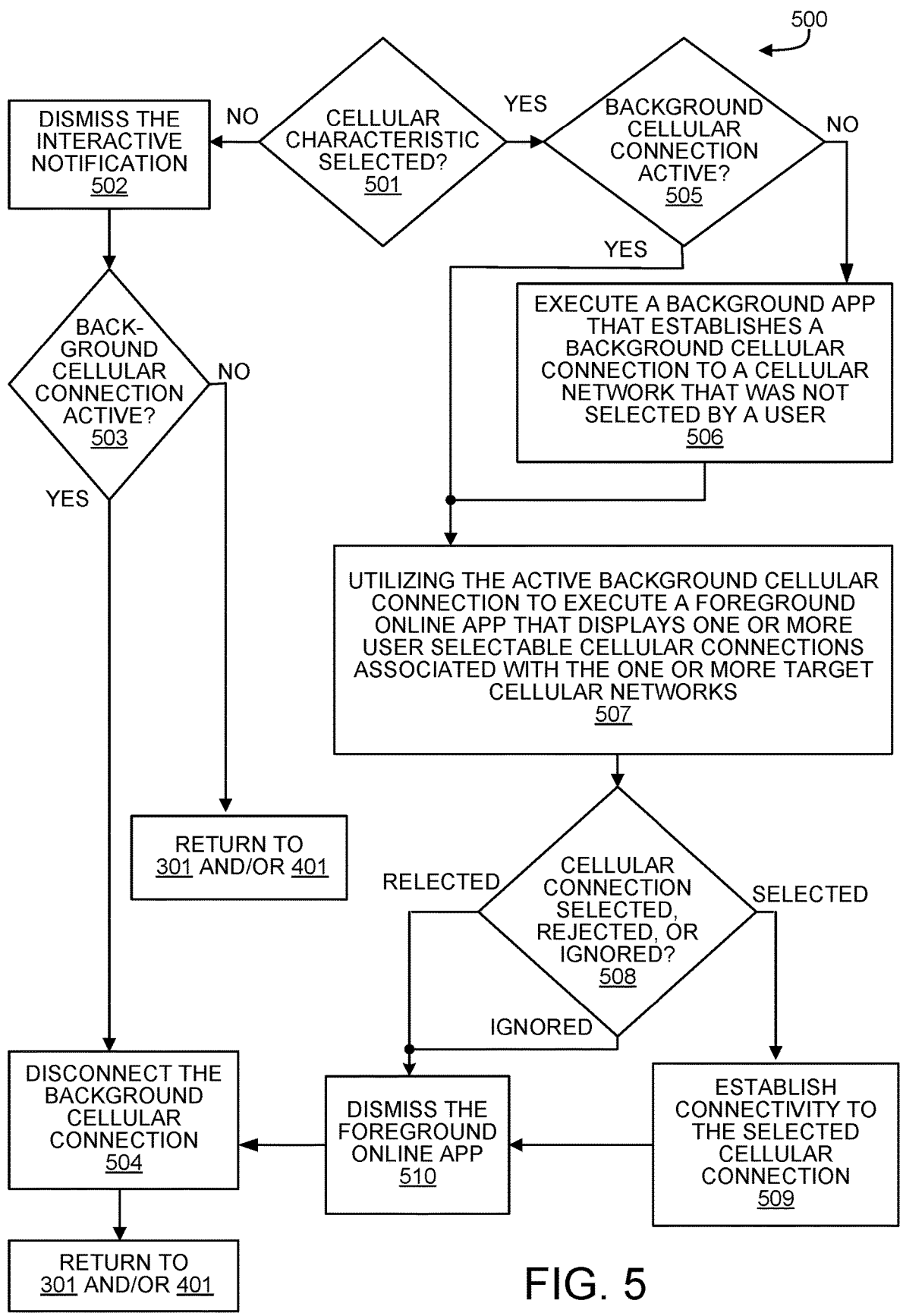
FIG. 5 is an example flow diagram illustrating an example method 500.

FIG. 5 is an example flow diagram illustrating an example method 500, which describes some example actions that may be performed by operation 306 of FIG. 3 and operation 407 of FIG. 4. At operation 501, one or more processors determine whether a cellular characteristic is selected. If not, at operation 502 one or more processors dismisses the interactive notification. At operation 503, one or more processors determine whether a background cellular connection is active. If not, example methods return to operations 301 and/or 401. If at operation 503 one or more processors determine that a background cellular connection is active, at operation 504, one or more processor disconnects the background cellular connection and returns to operations 301 and/or 401.

If at operation 501, one or more processors determine that a cellular characteristic is selected, example methods move to operation 505 where one or more processors determine whether a background cellular connection is active. If not, at operation 506, one or more processors execute a background app that establishes a background cellular connection to a cellular network that was not selected by a user (e.g., a cellular network that is was selected by the PC operation system developer), and the method moves to operation 507. If at operation 505, one or more processors determine that a background cellular connection is active, example methods move to operation 507. At operation 507, one or more processors utilize the active background cellular connection to execute a foreground online app that displays one or more user selectable cellular connections associated with one or more target cellular networks. In examples, a mobile PC may be configured to identify whether a cellular network is a target cellular network (e.g., approved) and/or a remote application may be configured to identify whether a cellular network is a target cellular network (e.g., approved).

At operation 508, one or more processors determine whether a displayed cellular connection has been selected, rejected or ignore. If a displayed cellular connection has been selected, then at operation 509, one or more processors establish connectivity to the selected cellular connection and moves to operation 510 where one or more processors dismiss the foreground online application. If at operation 508, a displayed cellular connection has been rejected or ignore, then example methods move to operation 510. In examples, methods move from operation 510 to 504 where one or more processor disconnects the background cellular connection. In examples, after operation 504, methods return to operations 301 and/or 401.

Example Operating Environment

Figure 6:
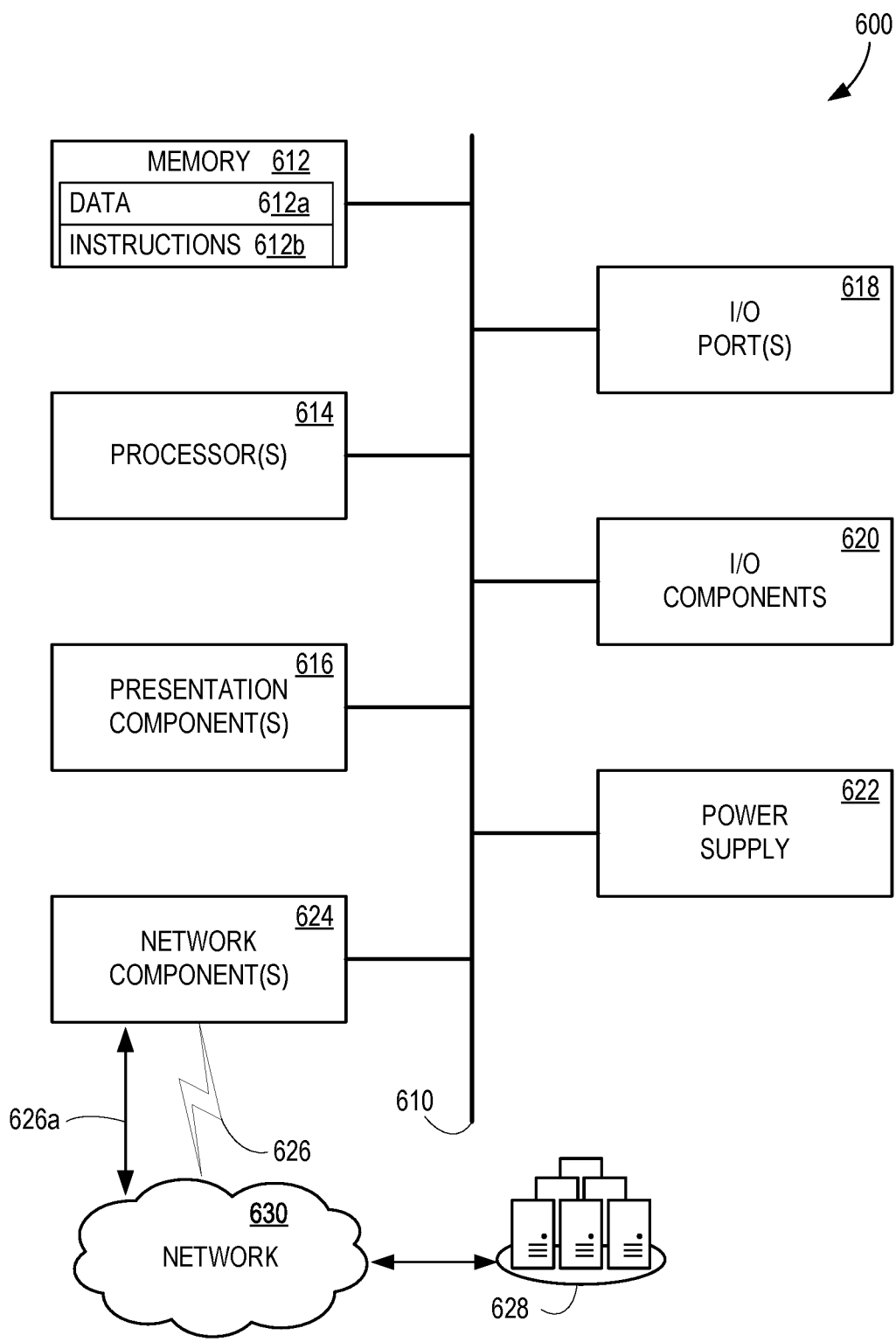
FIG. 6 is an example block diagram illustrating an example computing environment suitable for implementing some of the various examples disclosed herein.

FIG. 6 is a block diagram of an example computing device 600 for implementing aspects disclosed herein and is designated generally as computing device 600. Computing device 600 is an example of a suitable computing environment and is not intended to suggest any limitation as to the scope of use or functionality of the examples disclosed herein. Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer-storage memory 612, one or more processors 614, one or more presentation components 616, I/O ports 618, I/O components 620, a power supply 622, and network component(s) 624. While computing device 600 is depicted as a seemingly single device, multiple computing devices 600 may work together and share the depicted device resources. For example, memory 612 may be distributed across multiple devices, and processor(s) 614 may be housed with different devices.

Bus 610 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer-storage media references below and operatively provide storage of computer-readable instructions, data structures, program modules and other data for computing device 600. In some examples, memory 612 stores one or more of an operating system, a universal application platform, or other program modules and program data. Memory 612 is thus able to store and access data 612a and instructions 612b that are executable by processor 614 and configured to carry out the various operations disclosed herein.

In some examples, memory 612 includes computer-storage media in the form of volatile and/or non-volatile memory, removable or non-removable memory, data disks in virtual environments, or a combination thereof. Memory 612 may include any quantity of memory associated with or accessible by computing device 600. Memory 612 may be internal to computing device 600 (as shown in FIG. 6), external to computing device 600 (not shown), or both (not shown). Examples of memory 612 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 600. Additionally, or alternatively, memory 612 may be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for computer-storage memory 612, and none of these terms include carrier waves or propagating signalling.

Processor(s) 614 may include any quantity of processing units that read data from various entities, such as memory 612 or I/O components 620 and may include CPUs and/or GPUs. Specifically, processor(s) 614 are programmed to execute computer-executable instructions for implementing aspects of the disclosure. The instructions may be performed by the processor, by multiple processors within computing device 600, or by a processor external to client computing device 600. In some examples, processor(s) 614 are programmed to execute instructions such as those illustrated in the in the accompanying drawings. Moreover, in some examples, processor(s) 614 represent an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

Computing device 600 may operate in a networked environment via network component(s) 624 using logical connections to one or more remote computers. In some examples, network component(s) 624 includes a network interface card and/or computer-executable instructions (e.g., a driver) for operating the network interface card. In some examples, network component(s) 624 includes a network modem and/or computer-executable instructions (e.g., a driver) for operating the network modem. Communication between computing device 600 and other devices may occur using any protocol or mechanism over any wired or wireless connection. In some examples, network component(s) 624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component(s) 624 communicates over wireless communication link 626 and/or a wired communication link 626a to a cloud resource 628 across network 630. Various different examples of communication links 626 and 626a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile PCs, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and non-volatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Example systems for controlling network connectivity of a mobile PC that executes a PC operating system comprising at least one memory and at least one memory and at least one processor, coupled to the memory. In examples, the at least one processor monitors connectivity of an existing WiFi connection of the mobile PC and based at least on the monitoring, detects one or more conditions of the existing WiFi connection that triggers a connectivity analysis. Further, based on the triggering, the at least one processor performs the connectivity analysis, which at least determines dynamic connectivity characteristics of the existing WiFi connection and determines dynamic connectivity characteristics of one or more target cellular connections. Further still, based at least on the connectivity analysis, the at least one processor generates an interactive notification including at least one determined characteristic of the existing WiFi connection and at least one determined characteristic of the one or more target cellular connections. In examples, the system also includes an interactive graphical user interface that at least displays the generated interactive notification and obtains selection input indicating which connection is preferred.

Example methods for controlling network connectivity of a mobile Personal Computer (PC) that executes a PC operating system comprising monitoring, by at least one processor, connectivity of an existing WiFi connection of the mobile PC and based at least on the monitoring, detecting one or more conditions of the existing WiFi connection that triggers a connectivity analysis. Further, based on the triggering, the method performs the connectivity analysis at least by determining dynamic connectivity characteristics of the existing WiFi connection and determining dynamic connectivity characteristics of one or more target cellular connections. Based at least on the connectivity analysis, the method also generates an interactive notification including at least one determined characteristic of the existing WiFi connection and at least one determined characteristic of the one or more target cellular connections. In examples, the method also displays the generated interactive notification on an interactive graphical user interface and obtains selection input indicating which connection is preferred.

Exemplary computer storage devices having computer-executable instructions stored thereon for controlling network connectivity of a mobile Personal Computer (PC) that executes a PC operating system, which, on execution by a computer, cause the computer to perform operations including monitoring connectivity of an existing WiFi connection of the mobile PC. In examples, based at least on the monitoring, computer-executable instructions cause the computer to one or more conditions of the existing WiFi connection that triggers a connectivity analysis. Based at least on the triggering, exemplary computer-executable instructions cause the computer to perform the connectivity analysis at least by determining dynamic connectivity characteristics of the existing WiFi connection and determining dynamic connectivity characteristics of one or more target cellular connections. Based at least on the connectivity analysis, exemplary computer-executable instructions cause the computer to generate an interactive notification including at least one determined characteristic of the existing WiFi connection and at least one determined characteristic of the one or more target cellular connections. Further, example computer-executable instructions cause the computer to display the generated interactive notification on an interactive graphical user interface and obtain selection input indicating which connection is preferred.

Alternatively, or in addition to the other examples described herein, examples include any combination of the following:

wherein the at least one processor further at least monitors accessibility of a plurality of target cellular connections; and the connectivity analysis determines dynamic connectivity characteristics of accessible ones of the one or more target cellular connections;

wherein the connectivity analysis is triggered at least by a detected condition, of the one or more conditions, that indicates the mobile PC lost connectivity of the existing WiFi connection;

wherein a cellular modem that establishes a background cellular connection to a cellular network, and wherein responsive to the selection input indicating the one or more target cellular connections is the preferred connection, the at least one processor executes a foreground online application that causes the interactive graphical user interface to display one or more selectable cellular connections associated with the one or more target cellular connections;

wherein the interactive graphical user interface further at least obtains input indicating a selection of a cellular connection of the one or more selectable cellular connections, and wherein the cellular modem, responsive to the input, establishes a foreground cellular connection with the selected cellular connection indicated by the input and disconnects the background cellular connection from the cellular network;

wherein at least one of the one or more conditions is a threshold bandwidth measurement;

wherein the generated interactive notification indicates at least that: a connection to the existing WiFi connection is not a secure connection; and a connection to the one or more target cellular connections is a secure connection;

wherein the generated interactive notification indicates at least that the at least one determined characteristic of the one or more target cellular connections indicates a higher bandwidth measurement than the existing WiFi connection;

wherein the one or more conditions of the existing WiFi connection that triggers the connectivity analysis comprises at least one of: security properties; bandwidth measurements; quality of service measurements; foreground apps running on the mobile PC; background apps running on the mobile PC; a detected location of the mobile PC; data usage measurements; user preference settings; and usage patterns of the mobile PC.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. Further, methods 300 and 400 may be performed operation before, contemporaneously with, or after. Further still, methods 300 and 400 may be combined such that one or more operations thereof are combined to contemplate yet another method herein. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It will be appreciated that the above embodiments have been described by way of example only. Other applications or variants of the disclosed techniques may become apparent to a person skilled in the art given the disclosure herein. The scope of the present disclosure is not limited by the above-described embodiments but only by the accompanying claims.

The invention claimed is:

1. A system for controlling network connectivity of a mobile Personal Computer (PC) that executes a PC operating system comprising:
at least one memory;
at least one processor, coupled to the memory, that:
monitors connectivity of an existing WiFi connection of the mobile PC;
based at least on the monitoring, detects one or more conditions of the existing WiFi connection that triggers a connectivity analysis,
based on the triggering, performs the connectivity analysis on one or more connectivity signals, which at least determines dynamic connectivity characteristics of the existing WiFi connection and determines dynamic connectivity characteristics of one or more target cellular connections, the dynamic connectivity characteristics including at least one of bandwidth measurements or quality of service measurements;
based at least on the connectivity analysis, generates an interactive notification including at least one determined characteristic of the existing WiFi connection and at least one determined characteristic of the one or more target cellular connections; and
an interactive graphical user interface that at least:
displays the generated interactive notification,
obtains selection input indicating a preferred connection between the existing WiFi connection and the one or more target cellular connections; and
a cellular modem that establishes a foreground cellular connection with the selected one or more target cellular connection and disconnects a background cellular connection established prior to obtaining the selection input.

2. The system of claim 1, wherein the at least one processor further at least:
monitors accessibility of a plurality of target cellular connections; and
the connectivity analysis determines dynamic connectivity characteristics of accessible ones of the one or more target cellular connections.

3. The system of claim 1, wherein the connectivity analysis is triggered at least by a detected condition, of the one or more conditions, that indicates the mobile PC lost connectivity of the existing WiFi connection.

4. The system of claim 1 wherein responsive to the selection input indicating the one or more target cellular connections is the preferred connection, the at least one processor executes a foreground online application that causes the interactive graphical user interface to display one or more selectable cellular connections associated with the one or more target cellular connections.

5. The system of claim 4, wherein the at least one processor further obtains input indicating a selection of a cellular connection of the one or more selectable cellular connections, and
wherein the cellular modem, responsive to the input, establishes the foreground cellular connection with the selected cellular connection indicated by the input and disconnects the background cellular connection from the cellular network.

6. The system of claim 1 wherein at least one of the one or more conditions is a threshold bandwidth measurement.

7. The system of claim 1, wherein the generated interactive notification indicates at least that:
a connection to the existing WiFi connection is not a secure connection; and
a connection to the one or more target cellular connections is a secure connection.

8. The system of claim 1, wherein the generated interactive notification indicates at least that the at least one determined characteristic of the one or more target cellular connections indicates a higher bandwidth measurement than the existing WiFi connection.

9. The system of claim 1, wherein the one or more conditions of the existing WiFi connection that triggers the connectivity analysis comprises at least one of:
security properties;
bandwidth measurements;
quality of service measurements;
foreground apps running on the mobile PC;
background apps running on the mobile PC;
a detected location of the mobile PC;
data usage measurements;
user preference settings; and
usage patterns of the mobile PC.

10. A method for controlling network connectivity of a mobile Personal Computer (PC) that executes a PC operating system comprising:
monitoring, by at least one processor, connectivity of an existing WiFi connection of the mobile PC;

based at least on the monitoring, detecting one or more conditions of the existing WiFi connection that triggers a connectivity analysis, based on the triggering, performing the connectivity analysis on one or more connectivity signals at least by determining dynamic connectivity characteristics of the existing WiFi connection and determining dynamic connectivity characteristics of one or more target cellular connections, the dynamic connectivity characteristics including at least one of bandwidth measurements or quality of service measurements;

based at least on the connectivity analysis, generating an interactive notification including at least one determined characteristic of the existing WiFi connection and at least one determined characteristic of the one or more target cellular connections;

displaying the generated interactive notification on an interactive graphical user interface;

obtaining selection input indicating a preferred connection between the existing WiFi connection and the one or more target cellular connections; and establishing a foreground cellular connection with the selected one or more target cellular connections and disconnects a background cellular connection established prior to obtaining the selection input.

11. The method of claim 10 further comprising:
monitoring accessibility of a plurality of target cellular connections; and
determining dynamic connectivity characteristics of accessible ones of the one or more target cellular connections.

12. The method of claim 10, wherein the connectivity analysis is triggered at least by a detected condition, of the one or more conditions, that indicates the mobile PC lost connectivity of the existing WiFi connection.

13. The method of claim 10 further comprising:
responsive to the selection input indicating the one or more target cellular connections is the preferred connection, executing a foreground online application causing the interactive graphical user interface to display one or more selectable cellular connections associated with the one or more target cellular connections.

14. The method of claim 13 further comprising:
obtaining input indicating a selection of a cellular connection of the one or more selectable cellular connections;
responsive to the input, establishing, by the cellular modem, the foreground cellular connection with the selected cellular connection indicated by the input; and
disconnecting the background cellular connection from the cellular network.

15. The method of claim 10 wherein at least one of the one or more conditions is a threshold bandwidth measurement.

16. The method of claim 10, wherein the generated interactive notification indicates at least that:
a connection to the existing WiFi connection is not a secure connection; and
a connection to the one or more target cellular connections is a secure connection.

17. The method of claim 10, wherein the one or more conditions of the WiFi network that triggers the connectivity analysis comprises at least one of:

security properties;
bandwidth measurements;
quality of service measurements;
foreground apps running on the mobile PC;
background apps running on the mobile PC;
a detected location of the mobile PC;
data usage measurements;
user preference settings; and
usage patterns of the mobile PC.

18. An apparatus including a mobile Personal Computer (PC) and one or more computer storage devices having computer-executable instructions stored thereon for controlling network connectivity of the PC that executes a PC operating system, which, on execution by a computer, cause the computer to perform operations comprising:
monitoring connectivity of an existing WiFi connection of the mobile PC;
based at least on the monitoring, detecting one or more conditions of the existing WiFi connection that triggers a connectivity analysis;
establishing, by a cellular modem, a background cellular connection to a cellular network;
based on the triggering, performing the connectivity analysis on one or more connectivity signals at least by determining dynamic connectivity characteristics of the existing WiFi connection and determining dynamic connectivity characteristics of one or more target cellular connections, the dynamic connectivity characteristics including at least one of bandwidth measurements or quality of service measurements;
based at least on the connectivity analysis, generating an interactive notification including at least one determined characteristic of the existing WiFi connection and at least one determined characteristic of the one or more target cellular connections;
displaying the generated interactive notification on an interactive graphical user interface;
obtaining selection input indicating which connection is preferred;
responsive to the selection input indicating the one or more target cellular connections is the preferred connection, executing a foreground online application causing the interactive graphical user interface to display one or more selectable cellular connections associated with the one or more target cellular connections;
obtaining input indicating a selection of a cellular connection of the one or more selectable cellular connections;
responsive to the input, establishing, by the cellular modem, a foreground cellular connection with the selected cellular connection indicated by the input; and
disconnecting the background cellular connection from the cellular network.

19. The apparatus of claim 18 wherein at least one of the one or more detected conditions indicates the mobile PC lost connectivity of the existing WiFi connection.

20. The apparatus of claim 18 wherein the one or more conditions of the existing WiFi connection that triggers the connectivity analysis comprises at least one of:
security properties; and
a detected location of the mobile PC.

* * * * *